United States Patent [19]
Yorde

[11] Patent Number: 6,155,576
[45] Date of Patent: *Dec. 5, 2000

[54] ROTARY POWER TOOL WITH EXPANDED COLLET RANGE

[75] Inventor: Rick Yorde, Danville, Ohio

[73] Assignee: Applied Innovation & Manufacturing Ltd., Danville, Ohio

[ * ] Notice: This patent is subject to a terminal disclaimer.

[21] Appl. No.: 09/274,804

[22] Filed: Mar. 23, 1999

[51] Int. Cl.[7] ....................................................... B23B 31/20
[52] U.S. Cl. .............................. 279/49; 279/46.3; 279/54; 408/240
[58] Field of Search ........................... 279/48, 49, 54–57, 279/46.2, 46.3; 408/240

[56] References Cited

U.S. PATENT DOCUMENTS

| 990,087 | 4/1911 | Whitehead | 279/49 |
|---|---|---|---|
| 2,211,216 | 8/1940 | Oster | 279/49 |
| 4,215,871 | 8/1980 | Hirsch et al. | 279/46.7 |

FOREIGN PATENT DOCUMENTS

| 97559 | 12/1939 | Sweden | 279/49 |
|---|---|---|---|
| 402536 | 12/1933 | United Kingdom | 279/48 |
| 996557 | 6/1965 | United Kingdom | 279/49 |

*Primary Examiner*—Steven C. Bishop
*Attorney, Agent, or Firm*—Dillis V. Allen, Esq.

[57] ABSTRACT

A rotary power tool designed to accept a wider range of tool shank diameters, and particularly larger diameters, without any special adapters, including a threaded output spindle with a stepped internal bore including an enlarged counter bore at its end. A one-piece collet having jaw segments, central shank portion, and a base is seated in the spindle bore so the jaw segments are cammed directly by the spindle end, and a collet nut threaded on the spindle, cams the distal ends of the jaw segments against the tool shank. The collet is designed so the larger tool shanks spread the jaws upon collet entry causing the shank portion of the collet to bulge outwardly as the collet jaws are cammed back into parallel relation against the large tool shank. This, in short, enables a smaller size collet to receive and clamp larger diameter tool shanks.

23 Claims, 3 Drawing Sheets

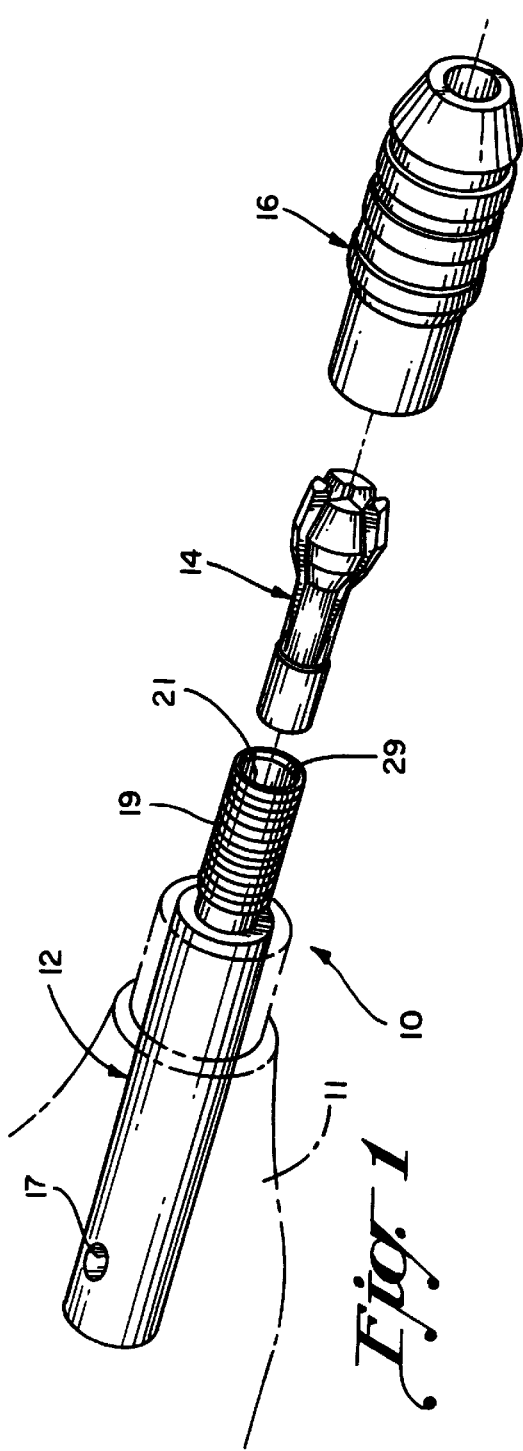

ROTARY POWER TOOL WITH EXPANDED COLLET RANGE

RELATED APPLICATION

This application is related to the co-pending application of Richard E. Yorde, Jr., U.S. Ser. No. 09/129,153, Filed: Aug. 5, 1998, entitled "TOOL BIT HOLDER", said application having a common ownership with the present application.

BACKGROUND OF THE INVENTION

Dremel[1] type rotary power tools have found considerable commercial success for several decades because of their low-cost and capability of accepting a wide variety of drills, grinding wheels, milling tools, and many other tool bits. One typical Dremel tool manufactured by Dremel is the "Multi-Pro™[2], Model 395, Type 5. This tool is a variable speed tool having a speed range from 5,000 to 30,000 rpm. The tool body is hand-held, elongated, and has a spindle coaxial with the central axis of the drive motor. The spindle is selectively locked in position by a radial push button that permits the user to screw and unscrew a collet nut on the spindle to gain access to the collet for removal or replacement.

1. Dremel is a registered trademark of S. B. Power Tool Co. of Chicago, Ill.
2. Multi-Pro is a trademark of S. B. Power Tool Co. of Chicago, Ill.

The collets designed for this particular tool are one-piece collets, and each collet is capable of accepting a single size tool shank; i.e., there is a separate collet for each shank size, $\frac{1}{32}$nd, $\frac{1}{16}$th, $\frac{3}{32}$nd, and $\frac{1}{8}$th inches. The collets themselves are one-piece sleeves having straight uniform diameter through bores there-through with small slots extending axially along the collets that enable the collet jaws to move radially a small distance. Because the through bore is of uniform diameter and the slots are very small, each collet is capable of accepting only a single diameter tool shank.

Each collet has an enlarged head portion that forms the jaws of the collet with tapered rear and forward outer surfaces that are cammed respectively by the end of the spindle and the interior frusto-conical surface of the collet nut.

To change collets, the user rotates the output spindle to the appropriate position to be locked and unscrews the collet nut from the spindle and removes the seated collet by grasping the collet head, replaces that collet with another size, and threads the collet nut back on the spindle, then inserts a tool shank having about the same diameter as the collet bore and continues screwing the collet nut down with the spindle lock button depressed.

While the Dremel type tool is an excellent tool for the hobbyist and small industrial jobs, the requirement for multiple collets is a considerable cost addition to the product and it necessitates frequent collet changing by the ultimate user, so it is somewhat of a nuisance to operate.

Thus, it would be desirable if the Dremel type tool could be redesigned in some fashion to eliminate the need for frequent collet replacement.

The co-pending application, U.S. Ser. No. 09/129,153, referred to above, attempts to ameliorate the collet change problem in Dremel type tools, but does so at the expense of complicating the tool design.

In that application, a tool bit holder is provided for use with a tool having a rotatable output shaft with a proximal end and a distal end, the output shaft having a hollow portion of predetermined diameter adjacent its distal end, and having a threaded portion, with the tool holder comprising a collet nut having a threaded portion for threaded engagement with the threaded portion of the tool output shaft, and having a hollow interior at least a portion of which is of greater diameter than the predetermined diameter of the hollow portion of the output shaft, and having an interiorly disposed camming surface, and having a collet disposed in said hollow interior portion of the collet nut and having a plurality of radially disposed resilient jaws each having a head portion and a shank portion, with the head portions having a first camming surface for camming engagement with the interiorly disposed camming surface of the collet nut, and the head portions having a second camming surface, and with the shank portions having a common free end which is receivable in the output shaft hollow portion and an annular expansion insert member disposed in said hollow interior of the collet nut and having an aperture of predetermined diameter through which the shank portions of the collet pass, the expansion insert member having a proximal end for bearing against the distal end of the tool output shaft, and having a distal end for bearing against the second camming surfaces of the head portions of the collet nut.

While this design works well and may be acceptable for many applications, it does somewhat add to the cost of the product because of the additional insert and a second disadvantage results from the requirement that the collet assembly including the collet nut extends further from the tool housing by a distance equal to the axial length of the annular insert. The problem with this is that you have excessive tool overhang that creates tool operation instability, increases tool run out, and reduces operator control.

Therefore, it would be desirable to eliminate the need for this insert, but thus far such a redesign has not been foreseeable prior to the present invention.

There are also a plurality of prior patents that disclose collet nut and spindle assemblies having one-piece collets. The following patents are included in that list:

| United States Patents | | |
|---|---|---|
| Inventor | Patent No. | Issue Date |
| Goodell | 141,345 | July 29, 1873 |
| Trump | 184,445 | Nov. 14, 1876 |
| Whitehead | 990,087 | Apr. 18, 1911 |
| Parker | 1,270,754 | June 25, 1918 |
| Jones | 1,745,302 | Jan. 28, 1930 |
| Corley | 1,857,012 | May 3, 1931 |
| Oster | 2,211,216 | Aug. 13, 1940 |
| Benjamin | 2,228,685 | Jan. 14, 1941 |
| Cohen | 2,341,529 | Feb. 15, 1944 |
| Benjamin, et al. | 2,358,300 | Sept. 19, 1944 |
| Godfrey | 2,374,192 | Apr. 24, 1945 |
| Mogilnicki | 5,383,673 | Jan. 24, 1995 |

Foreign Patent

Danish Patent No. 63054, Offentliggjort Den Dec. 27, 1944 Patented Mar. 13, 1943

All of these one-piece collet designs have a limited shank diameter range clamping ability.

The Whitehead, U.S. Pat. No. 990,087, discloses a one-piece collet with collet jaws 7 shown in FIG. 2 of the patent that are somewhat spread apart in the relaxed position of the collet jaws. There is no disclosure in this patent that the collet jaws 7 achieve parallelism when clamped against any size tool shank, and there moreover is insufficient space, in fact none, between the legs 6 of the collet and the tool shank 1 to permit any radial expansion of the lower end of the collet inside the tool shank. This would prevent the clamping jaws 7 from achieving parallel clamping action on a wide variety of tool shanks.

It is a primary object of the present invention to ameliorate the problems noted above in collet assemblies and provide a rotary power tool that is capable with a single one-piece collet of clamping a significantly wider variety of tool shank diameters.

SUMMARY OF THE PRESENT INVENTION

In accordance with the present invention, a rotary power tool is provided designed to accept a wider range of tool shank diameters and particularly larger diameters without any special adapters, including a threaded output spindle with a stepped internal bore including an enlarged counter bore at its end. A one-piece collet having jaw segments, a central shank portion, and a base is seated in the spindle bore so the jaw segments are cammed directly by the spindle end as the collet nut, threaded in the spindle, cams the distal ends of the jaw segments into parallelism against the tool shank. The collet is designed so the larger tool shanks spread the jaws upon collet entry causing the shank portion of the collet to bulge outwardly as the collet jaws are cammed back parallel against the larger tool shank. This, in short, enables a smaller size collet to accept and clamp a larger diameter tool shank, as well as smaller diameter tool shanks.

Toward these ends, the collet is machined from bar stock to initially form an enlarged head portion, a reduced diameter shank portion, and a somewhat larger base portion. A small diameter hole is drilled in the head portion and a large diameter hole is drilled in the base and shank portions, and the head and shank portions are slotted to form jaw segments. Thereafter, the collet is spread and may or may not be heat treated. Heat treating facilitates retention of the spread condition. The jaw segments are spread apart permanently, permitting the larger diameter shanks to enter the collet.

This spreading creates a taper on the inside jaw clamping surfaces that causes the shank portion of the collet to flex outwardly or inwardly as the inner jaw clamping surfaces are brought into parallelism when cammed against a straight tool shank. With the larger tool shanks, the shank portion of the collet bulges outwardly and with small tool shanks, the shank portion flexes inwardly. The outward bulging of the shank portion of the collet is unrestrained by the collet bore because the shank portion is positioned in the enlarged counter bore in the end of the spindle.

This spindle and collet design permits the Dremel type tool to accept tool shanks from 1/64th inch to 1/8th inch without the present need for switching collets.

Another aspect of the present invention is the collet radial slots are wider in the head portion than in the shank portion to permit greater radial jaw movement while enhancing the structural integrity of the shank portion. And the base portion is sized so it supports the end of the tool shank of the largest accepted shank; e.g., 0.125 (1/8th) inches.

The present spindle and collet design has several advantages over the collet assembly disclosed in the co-pending application, Ser. No. 09/129,153. The first and most obvious is the elimination of the annular insert without the elimination of its function, but ancillary to that benefit is the benefit of reducing the projecting length of the collet assembly, thereby increasing tool control, stability, and less run out. Another benefit, of course, is reduced weight.

Other objects and advantages of the present invention will appear more clearly from the following detailed description.

BRIEF DESCRIPTION OF THE DRAWINGS

FIG. 1 is an exploded perspective view of one end of the tool assembly, the output spindle, the collet, and the collet nut;

FIG. 2 is a front end view of the collet sub-assembly illustrated in FIG. 1;

FIG. 3 is a side view of the collet illustrated in FIGS. 1 and 2 shown in its relaxed position;

FIG. 4 is a longitudinal section of the collet illustrated in FIG. 3;

DETAILED DESCRIPTION OF THE PREFERRED EMBODIMENT

Figure 5:
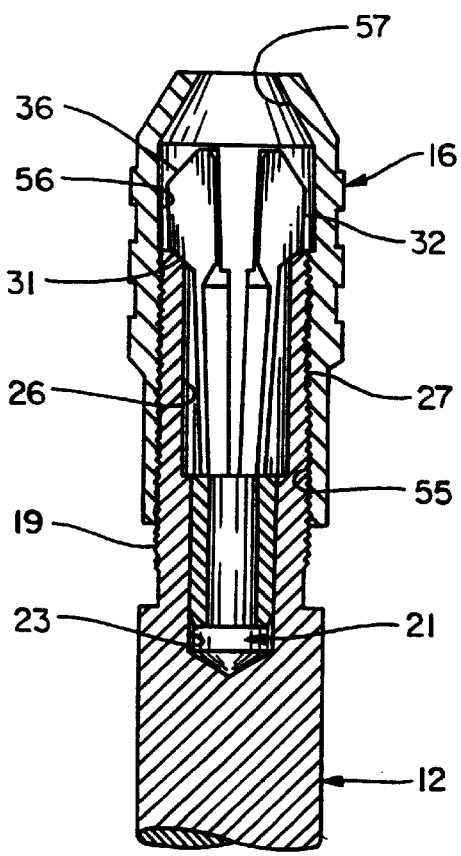
FIG. 5 is a longitudinal section of the spindle, collet, and collet nut assembly with the collet nut partly unthreaded and the collet in its relaxed position.

Referring to the drawings and particularly FIGS. 1 to 4, a rotary power tool 10 is illustrated including a tool body 11, an unshown rotary motor, an output spindle 12, a one-piece collet 14, and a collet nut 16. The unshown motor is coaxial with the output spindle 12, and the output spindle has an aperture 17 inside the body 11 that receives a pin reciprocal in the body for the purpose of selectively locking the spindle 12 to permit manual rotation of the collet nut 16.

The spindle 12 has a reduced diameter projecting threaded portion 19 that threadedly receives collet nut 16 and has an internal stepped bore 21.

As seen in FIG. 5, the stepped bore 21 has an inner reduced diameter portion 23 for receiving base portion 24 of the collet, an enlarged adjacent counter bore 26 for receiving central shank portion 27 of the collet and a chamfered end 29 for receiving and engaging collet frusto-conical cam surface 31, which is at the base of the collet jaw segments 32.

When the tool 10 is designed for 1/8th inch maximum tool shanks, bore portion 23 is about 0.170 inches in diameter, counter bore 26 is about 0.201 inches in diameter, and 0.206 inches in depth.

Figure 10:
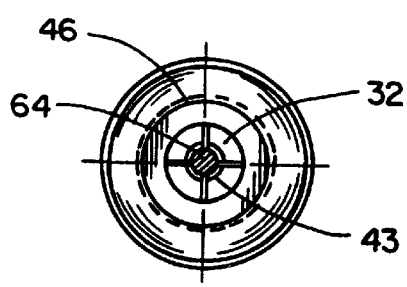

As seen in FIGS. 2, 3, and 4, the collet 14 includes four segmented jaw portions 32, each having a shank 27 portion integral with base 24, which has a diameter slightly larger than the shank portion 27 when fully contracted (See FIG. 10, for example). While the jaw segments 32 and the shank portions 27 are spread apart in FIGS. 2, 3 and 4, it should be understood that when the collet 14 is originally machined, the jaw segments 32 and the shank portions 27 are all parallel to one another. For the 1/8th inch maximum tool shank, base 24 has an outer diameter of 0.171 inches, and an inner diameter of 0.126 inches. Also in the as machined condition, the central shank portion has a uniform diameter of 0.156 inches, and a uniform inner diameter of 0.126 inches, and the combined axial length of the base portion 24 and the jaw portions 26 is 0.560 inches. The jaw segments have an outer annular flange 35, a forward outer frusto-conical camming surface 36, and an outer tip chamfer 37.

The jaw segments also have an inside chamfer at the tip designated 39 in FIGS. 2 and 4, that assist in guiding large diameter shanks into the bite of the collet.

The collet 14 is machined from round bar stock, and after turning the outer diameters, the inside bore 42 of the base portion and the shank portion 27 is drilled to a uniform diameter. Thereafter, a central bore 43 is drilled through the jaw segments 32 to a uniform diameter of about 0.080 inches for the 1/8th inch maximum tool shank collet. Four parallel sided slots 46 are then cut through the head of the collet to define the jaw segments 32. Adjacent communicating slots 48 are cut through shank portion 27 to define the individual shank portions attached to jaw segments 32. The slots 46 are substantially wider than the slots 48 to achieve a wide range of motion for the jaw segments 32 while at the same time maintaining the structural integrity of the shank portions 27. In the 1/8th inch maximum shank version, slots 46 have a width(as machined) of about 0.045 inches and the slots 48 have a uniform width of 0.025 inches. The overall length of the collet 14 for the 1/8th inch maximum tool shank size is about 0.910 inches. It is readily apparent from these dimensions that the drawings are not 1:1 scale, but they are approximately 2:1 scale.

After machining to the above dimensions with the slots 46 and 48 having uniform widths, the jaws are spread and the collet may or may not be heat treated. Heat treating facilitates the retention of the jaw segments 32 in their spread condition in the configuration shown in FIGS. 3, 4, and 5 in the drawings. This spreading results in the outer diameter of the bore 43 at the mouth of the collet indicated at 50 in the drawings to increase to about 0.130 with a preferable range of 0.125 to 0.140 inches, and the rear end of the bore 43 at 51 to be about 0.110 inches in a preferable range of 0.105 inches to 0.115 inches.

As seen in FIG. 5, the collet nut has a threaded base 55 threaded onto spindle threaded portion 19, an enlarged internal bore 56 adjacent jaw segments 32, and a forward inner frusto-conical camming surface 57 for engaging and camming cam surfaces 36 on the collet jaw segments 32. The inner bore 56 is larger than the inner diameter of the threaded base 55, which is sized to thread on a standard spindle size. It should be understood that the enlarged inner bore 56 of the collet nut is substantially wider than the outer diameter of the jaw segments 32 when in the relaxed position of the jaw segments illustrated in FIG. 5 to accommodate the outward movement of the jaw segments shown in FIGS. 6 and 7.

Figure 6:
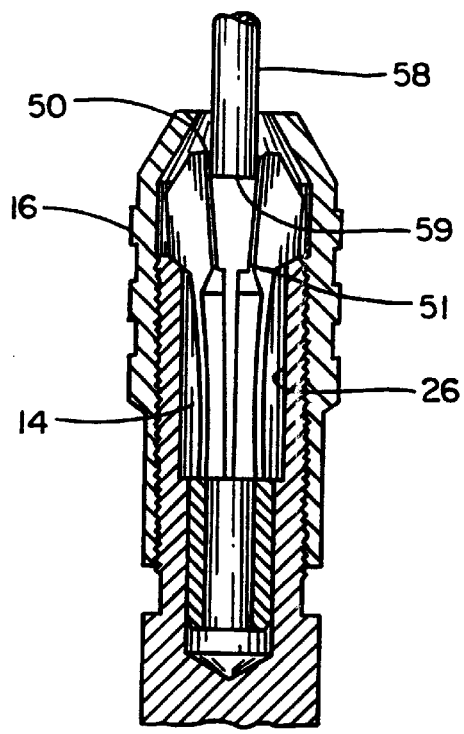
FIG. 6 is a fragmented FIG. 5 assembly illustrating a 1/8th inch tool shank being inserted into the collet.

In FIG. 6, a maximum diameter tool shank 58 is shown entering the collet nut 16 and collet 14, and in this case it is a 1/8th inch shank. Lower end 59 of the shank initially engages the inside bore 43 of the jaws near or on the chamfer 50. Chamfer 50 assures that if the jaws are slightly too close together, the shank 58 will still enter the jaw bore 43.

Figure 7:
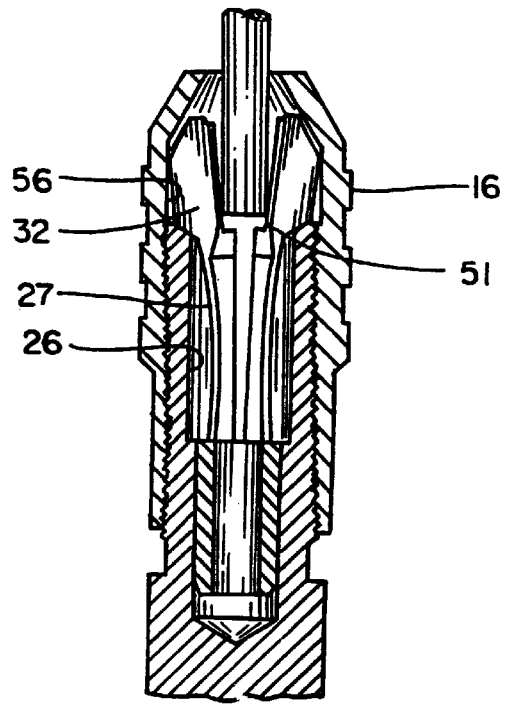
FIG. 7 is a fragmented assembly similar to FIG. 6 with the tool shank further into the collet, approximately midway into the collet jaws.

As the shank 58 is moved downwardly from its entry point to the position shown in FIG. 6, and then further down to the position shown in FIG. 7, and to the bottom of 51 of the bore 43, the jaw segments 32 will continue spreading, causing the shank segments or portions 27 to bend outwardly as seen in FIG. 7, into the enlarged counter bore 26. An important aspect of the present invention, of course, as noted above, is that the enlarged counter bore 26 permits this outward movement of the shank portions 27, and the enlarged interior bore 56 in the collet nut 16 permits the corresponding outward movement of the jaw segments 32.

Figure 8:
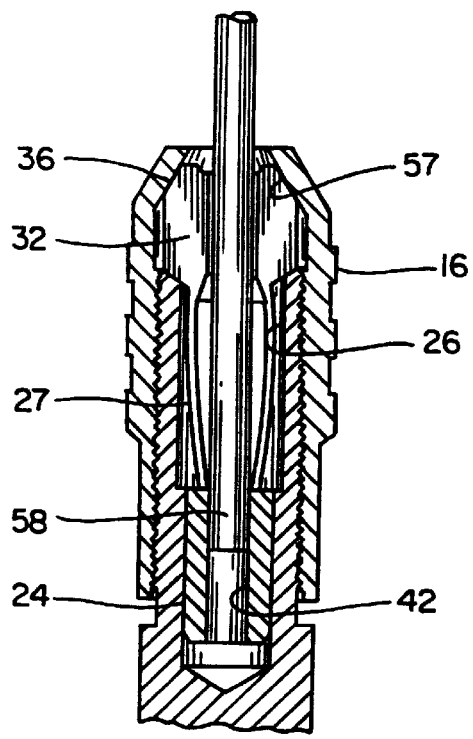
FIG. 8 is a longitudinal assembly similar to FIGS. 6 and 7 with the collet nut fully threaded and the collet jaws clamped against the 1/8th inch tool shank.

Tool shank 58 passes through the central shank portion 27 and enters the base 24 into its interior bore. The diameter of bore 42 is selected so that it supports the shank 58 of the largest diameter tool shank for which the collet 14 is designed. Thereafter, with the spindle locked by the operator, collet nut 16 is threaded downwardly so that its camming surface 57 cams the jaw segments camming surfaces 36, causing the jaw segments, and particularly the clamping surfaces 43, to return to parallelism, as seen in FIG. 8, in planar contact with the exterior surface of the tool shank 58. This movement causes the shank portions 27 to bulge outwardly, as seen in FIG. 8, to a point where the shank portions are closely adjacent or lightly engage the counter bore 26.

Figure 9:
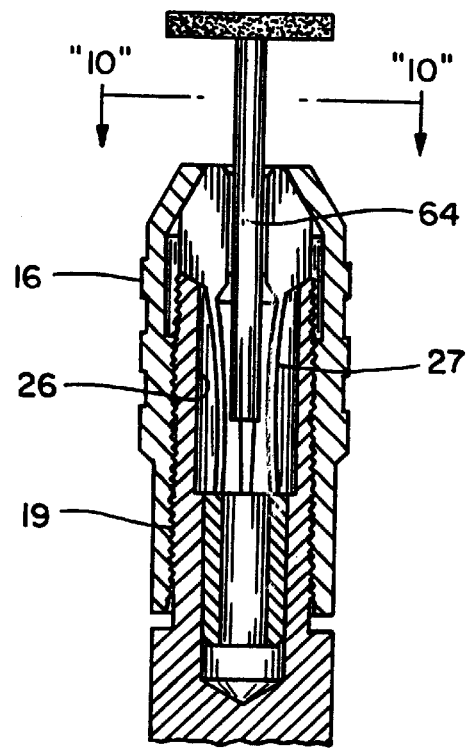
FIG. 9 is a longitudinal assembly similar to FIGS. 6, 7 and 8 with the collet assembly clamped against a small diameter tool shank; and, FIG. 10 is an end view of the collet assembly clamped against a small diameter tool taken generally along line 10—10 of FIG. 9.

As seen in FIGS. 9 and 10, the present tool 10 can clamp and hold a small diameter tool shank 64, which may for example, be a 1/32nd inch tool shank. In this case the collet nut 16 is threaded further downwardly on the threaded spindle portion 19 and the central shank portions bow inwardly in the counter bore 26, rather than outwardly, as they do with the large diameter shank illustrated in FIG. 8. In this position, jaw segments 32 illustrated in FIG. 10, almost touch one another, and slots 46 are almost closed.

What is claimed is:

1. A power tool having a collet assembly for securing a wider variety of tool shanks, comprising: a tool body having an output spindle with a threaded distal end, a collet receiving bore in the distal end of the spindle, a collet received in the bore having a distal end with a plurality of radially expandable and contractable jaw portions, and a proximal shank end with a plurality of radially expandable and contractable shank portions, first cam means on the distal end of the spindle for engaging and camming the jaw portions, a collet nut threadedly engaging the spindle distal end and having a second cam means for engaging and camming the jaw portions, and means to enable a greater range of radial movement of the jaw portions to secure a wider range of shank diameters including a radial chamber in the spindle collet receiving bore larder throughout its length than the collet shank portions and adjacent the collet shank portions to enable the collet shank portions to expand into the chamber as the collet jaw portions are cammed against larger tool shanks, said collet nut having an internal bore substantially larder than the jaw portions when relaxed and adjacent thereto to permit expansion of the jaw portions upon insertion of larger tool shanks.

2. A power tool as defined in claim 1, wherein the spindle has a proximal small inner first diameter portion, said collet having a non-expandable base closely received in the spindle small diameter portion to provide collet stability, said spindle having a distal larger second diameter portion adjacent the first cam means defining the radial chamber in the spindle.

3. A power tool as defined in claim 1, wherein the collet base has an outer diameter of about 0.170 inches and the spindle small first diameter portion is also about 0.170 inches.

4. A power tool having a collet assembly for securing a wider variety of tool shanks, comprising: a tool body having an output spindle with a threaded distal end, a collet receiving bore in the distal end of the spindle, a collet received in the bore having a distal end with a plurality of radially expandable and contractable jaw portions, and a proximal shank end with a plurality of radially expandable and contractable shank portions, first cam means on the distal end of the spindle for engaging and camming the jaw portions, a collet nut threadedly engaging the spindle distal end and having a second cam means for engaging and camming the jaw portions, and means to enable a greater range of radial movement of the jaw portions to secure a wider range of shank diameters including a radial chamber in the spindle collet bore adjacent the collet shank portions to enable the collet shank portions to expand into the chamber as the collet jaw portions are cammed against larger tool shanks, said collet being a one-piece member having a central bore therethrough with a plurality of communicating radial slots extending through the jaw portions and the shank portions, said central bore in the collet being tapered from the distal end of the jaw portions to the proximal end of the jaw portions to permit larger diameter tool shanks to engage the inner surfaces of the jaw portions and spread the jaw portions as the larger diameter tool shanks are inserted into the collet, said collet nut having a hollow interior portion of sufficient diameter to enable the jaw portions to expand as the larger diameter shanks spread the jaw portions upon tool shank insertion.

5. A power tool as defined in claim 4, wherein said collet nut has a base with a threaded portion engaging the spindle distal end, said threaded portion having a smaller diameter than said collet nut interior portion.

6. A power tool as defined in claim 4, wherein the central bore in the collet jaw portions has a diameter at its distal end of about 0.130 inches and a diameter at its proximal end of about 0.110 inches to accommodate larger diameter tool shanks having a diameter about 0.125 inches.

7. A power tool having a collet assembly for securing a wider variety of tool shanks, comprising: a tool body having an output spindle with a threaded distal end, a collet receiving bore in the distal end of the spindle, a collet received in the bore having a distal end with a plurality of radially expandable and contractable jaw portions, and a proximal shank end with a plurality of radially expandable and contractable shank portions, first cam means on the distal end of the spindle for engaging and camming the jaw portions, said first cam means being integral with and formed directly on the end of the spindle, a collet nut threadedly engaging the spindle distal end and having a second cam means for engaging and camming the jaw portions, and means to accommodate larger diameter tool shanks including a central bore through the collet with a plurality of communicating radial slots extending through the jaw portions and the shank portions, said central bore in the collet being tapered from the distal end of the jaw portions to the proximal end of the jaw portions to permit larger diameter tool shanks to engage the inner surfaces of the jaw portions and spread the jaw portions as the larger diameter tool shanks are inserted into the collet, said collet nut having a hollow interior portion of sufficient diameter to enable the jaw portions to expand as the larger diameter shanks spread the jaw portions upon bit insertion.

8. A power tool as defined in claim 7, wherein the central bore in the collet jaw portions has a diameter at its distal end of about 0.125 inches and a diameter at its proximal end of about 0.105 inches to accommodate larger diameter tool shanks having a diameter about 0.125 inches.

9. A power tool as defined in claim 7, including means to enable a greater range of radial movement of the jaw portions to secure a wider range of shank diameters including a radial chamber in the spindle collet bore adjacent the collet shanks portion to enable the collet shank portions to expand into the chamber as the collet jaw portions are cammed against larger tool shanks.

10. A power tool as defined in claim 7, wherein the spindle has a proximal small inner first diameter portion, said collet having a non-expandable base closely received in the spindle small diameter portion to provide collet stability, said spindle having a distal larger second diameter portion adjacent the first cam means defining the radial chamber in the spindle.

11. A power tool as defined in claim 10, wherein the collet bore has an outer diameter of about 0.170 inches and the spindle first small diameter portion is also about 0.170 inches.

12. A one-piece collet for receiving and clamping larger diameter tool shanks, comprising: a one-piece collet member having a central bore therethrough and a plurality of radial slots extending therefrom defining flexible, distal jaw portions and connected proximal shank portions, said central bore having a tapered portion adjacent the jaw portions with a larger diameter adjacent the distal end of the tapered portion, and a small diameter adjacent the proximal end of the tapered portion, said larger diameter of the tapered bore portion being selected about equal to the largest diameter tool shank usable with the collet to engage upon insertion into the tapered bore portion and cause the jaw portions to spread outwardly, said radial slots adjacent the jaw portions and the shank portions being sized to cause the jaw portions after spreading to clamp into parallel contact with the largest diameter tool shank and to permit the shank portions to bow outwardly to accommodate the parallel contact of the jaw portions with the largest diameter tool shank, said largest diameter of the central bore tapered portion being about 0.125 inches and the smallest diameter thereof is about 0.105 inches when the largest shank diameter is about 0.125 inches.

13. A one-piece collet as defined in claim 12, wherein the collet has a proximal base and the central bore has an inner diameter adjacent the base of about 0.125 inches to receive and support the inner end of the largest tool shank.

14. A one-piece collet as defined in claim 13, wherein the collet base has an outer diameter of about 0.170 inches.

15. A one-piece collet as defined in claim 12, wherein the central bore through the collet has a substantially larger diameter adjacent the collet shank portion than the jaw portions.

16. A method of manufacturing a one-piece collet to accept a wider range of tool shank diameters, including the steps of: forming the outer diameter of a rod with an enlarged head portion, a central shank portion and a proximal base portion adjacent the shank portion, forming an enlarged bore in the shank and base portion, forming a relatively smaller bore in the head portion, forming radial slots in the head portion and shank portions, to define jaw portions in the head portions, and thereafter permanently spreading the jaw portions to accept larger diameter tool shanks.

17. A method of manufacturing a one-piece collet as defined in claim 16, including the step of heat treating the rod after the step of spreading the jaw portions.

18. A method of manufacturing a one-piece collet as defined in claim 16, wherein the step of forming the enlarged bore in the shank portion and base portion includes drilling a uniform diameter first bore in the shank and base portions, said step of forming a relatively smaller diameter bore in the head portion includes drilling a smaller uniform diameter second bore in the head portion.

19. A method of manufacturing a one-piece collet as defined in claim 18, wherein the second bore is formed about 0.080 inches, and the step of spreading the jaw portions includes the step of spreading the jaw portions so the distal end of the smaller bore in the head portion is about 0.130 inches.

20. A method of manufacturing a one-piece collet as defined in claim 16, wherein the step of forming radial slots in the head portion and shank portion includes forming substantially wider slots in the head portion than the shank portion to increase the range of radial movement of the jaw portions without increasing the structural integrity of the shank portion.

21. A method of manufacturing a one-piece collet to accept a wider range of tool shank diameters, including the steps of: forming the outer diameter of a road with an enlarged head portion, a central shank portion and a proximal base portion adjacent the shank portion, forming an enlarged bore in the shank and base portion, forming a relatively smaller bore in the head portion, forming radial slots in the head portion and shank portions, to define jaw portions in the head portions, and thereafter permanently spreading the jaw portions to accept larger diameter tool shanks, the step of forming the enlarged bore in the shank portion and base portion includes drilling a uniform diameter first bore in the shank and base portions, said step of forming a relatively smaller diameter bore in the head portion includes drilling a uniform diameter second bore in the head portion, and the step of spreading the jaw portions includes heat treating the collet.

22. A method of manufacturing a one-piece collet as defined in claim 21, wherein the second bore is formed about 0.080 inches, and the step of spreading the jaw portions includes the step of spreading the jaw portions so the distal end of the smaller bore in the head portion is about 0.130 inches.

23. A method of manufacturing a one-piece collet as defined in claim 21, wherein the step of forming radial slots in the head portion and shank portion includes forming substantially wider slots in the head portion than the shank portion to increase the range of radial movement of the jaw portions without increasing the structural integrity of the shank portion.

\* \* \* \* \*